(12) United States Patent
Anderson et al.

(10) Patent No.: US 11,138,184 B2
(45) Date of Patent: Oct. 5, 2021

(54) MAINTAINING DATA INTEGRITY AND REFERENTIAL DATA INTEGRITY WITHIN AN ENTERPRISE DATA REGISTRY

(71) Applicant: Bank of America Corporation, Charlotte, NC (US)

(72) Inventors: Norman Wesley Anderson, Charlotte, NC (US); John S. Garbarino, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 933 days.

(21) Appl. No.: 15/498,023

(22) Filed: Apr. 26, 2017

(65) Prior Publication Data

US 2018/0314724 A1    Nov. 1, 2018

(51) Int. Cl.
*G06F 16/23* (2019.01)
*G06F 9/451* (2018.01)

(52) U.S. Cl.
CPC .......... *G06F 16/2365* (2019.01); *G06F 9/451* (2018.02)

(58) Field of Classification Search
CPC .............................. G06F 16/2365; G06F 9/451
USPC ........................................................ 707/690
See application file for complete search history.

(56) References Cited

U.S. PATENT DOCUMENTS

| 6,343,295 | B1 | 1/2002 | MacLeod et al. | |
|---|---|---|---|---|
| 7,676,586 | B2 | 3/2010 | Kaler et al. | |
| 8,250,099 | B2 | 8/2012 | Wilson et al. | |
| 8,880,586 | B2 | 11/2014 | Noor et al. | |
| 9,348,879 | B2 | 5/2016 | Mohammad et al. | |
| 9,384,231 | B2 | 7/2016 | Benjamin et al. | |
| 9,514,203 | B2 | 12/2016 | Mohammad et al. | |
| 2009/0300709 | A1* | 12/2009 | Chen ..................... | G06F 16/972 726/1 |
| 2014/0379665 | A1* | 12/2014 | Benjamin .............. | G06Q 40/00 707/687 |
| 2015/0039320 | A1* | 2/2015 | Neuhauser .............. | G06F 16/21 704/500 |
| 2016/0154840 | A1* | 6/2016 | Cazemier .............. | G06F 16/215 707/692 |

OTHER PUBLICATIONS

Google Search for "Join Table," Retrieved on Apr. 4, 2017.
Google Search for "JSON Schema," Retrieved on Apr. 4, 2017.

* cited by examiner

*Primary Examiner* — Allen S Lin
(74) *Attorney, Agent, or Firm* — Weiss & Arons LLP; Michael A. Springs, Esq.

(57) ABSTRACT

A method for maintaining data integrity and referential data integrity within an enterprise data registry is provided. The method may use a JSON API to structure incoming data such that the incoming data is only accepted at a central repository when the incoming data normalized and properly referenced. Ensuring the proper relationships within a JSON API may require the use of bridge tables and/or mapping schemes to correctly identify many to many relationships between entities and attributes within metadata elements.

12 Claims, 5 Drawing Sheets

MAINTAINING DATA INTEGRITY AND REFERENTIAL DATA INTEGRITY WITHIN AN ENTERPRISE DATA REGISTRY

FIELD OF TECHNOLOGY

This invention relates to maintaining data integrity and referential data integrity within an enterprise data registry. Specifically, this invention relates to methods and apparatus for ensuring data integrity and referential data integrity during transmission of metadata to the enterprise data registry.

BACKGROUND OF THE DISCLOSURE

Conventionally, metadata elements are stored in spreadsheets. These spreadsheets include large amounts of data. The spreadsheets can include multiple errors because the metadata elements are typically input by humans. In addition, few methods for ensuring and/or checking accuracy of the spreadsheets are available. Also, use of the spreadsheets provides no specific method for maintaining relationships between metadata entities and attributes, and therefore, presents difficulties maintaining accurate relationships between metadata entities and attributes.

Therefore, it would be desirable to have a metadata repository system configured to maintain metadata integrity and metadata relationships between metadata entities and attributes. It would be further desirable to have the metadata repository system configured to enforce schema ensuring preservation of high data quality, including proper and intact relationships. It would yet further be desirable to have the metadata repository system configured for retrieval of current details associated with the metadata. These objectives may be met with a JavaScript object notation ("JSON") application programming interface ("API") that includes schema enforcement. It would be further desirable for the architecture of the metadata repository system to include three layers or three tiers. A first tier may be the local systems. A second tier may be the local repositories. A third tier may be a central repository, also referred to herein as an enterprise data registry.

SUMMARY OF THE DISCLOSURE

An apparatus for collecting a plurality of metadata elements via an updatable JavaScript Object Notation ("JSON") Application Programming Interface ("API") is provided. The apparatus may include a plurality of local systems. The apparatus may include a plurality of local repositories. The apparatus may include an enterprise data registry.

A plurality of metadata may be generated and/or stored at the local systems. The local repositories may be configured to receive the plurality of metadata elements from the plurality of local systems. The enterprise data registry may be configured to receive the plurality of metadata elements from the plurality of local repositories. The pluralities of metadata elements may be transmitted from the local systems to the local repositories and from the local repositories to the enterprise data registry via the updatable JSON API.

The updatable JSON API may be configured to maintain the relationships between metadata elements included in the pluralities of metadata elements. Specifically, the JSON API may be configured to maintain relationships between entities and attributes included in the metadata elements. The updatable JSON API may also be configured to maintain data integrity of the plurality of metadata elements. The JSON API may reject duplicate metadata elements. The JSON API may also reject metadata elements that lack the required relationships.

The apparatus may also include a quality check center. The quality check center may include a plurality of quality checks. Each quality check may inspect the plurality of metadata elements to ensure that the metadata elements confirm to a specific requirement. Exemplary quality checks include checking for duplicated metadata elements and checking for misspelled metadata elements.

Each quality check may include a switch capability. The switch capability may enable each quality check to be turned on or off. Each quality check may be turned on or off when a number of attributes associated with the metadata transmission reaches a predetermined threshold. A metadata transmission may be transmission of a subset of metadata elements from the local repositories to the enterprise data registry.

At times, the number of attributes associated with the metadata transmission is larger than the predetermined threshold. Because of the relatively large number of attributes, it may take more than a predetermined amount of processing cycles to perform a specific quality check. Therefore, a quality check may be turned off in order to preserve processing cycles.

At times, a metadata element, which may be included in the subset of metadata elements, is determined by the updatable JSON API to be incomplete. The incompleteness may be determined by one of the quality checks. The incompleteness of the metadata element may be fatal to the viability of the metadata element within the enterprise data registry. Therefore, the apparatus may be configured to halt the transmission of the entire subset of the plurality of metadata elements to the enterprise data registry. This may ensure that the incomplete data element is not entered into the enterprise data registry.

The apparatus may be configured to transmit an alert to the local repository from which the subset of metadata elements that includes the incomplete metadata element was received. The alert may relate to the subset of the plurality of metadata elements and the incomplete metadata element. The alert may include an email notification. The email notification may describe, at least in part, the reason for the incompleteness of the metadata element. The email notification may also include a uniform resource locator ("URL"). The URL, when selected, may direct a user to a webpage. The webpage may display a copy of the transmitted subset of metadata elements. The transmitted subset of metadata elements may be formatted to conform with the updatable JSON API. The webpage may include highlights to specific values and rows. The highlights, or other indication, may pinpoint specific values, rows attributes entities, relationships or other information that require correction. The email notification may also include instructions for correction of the incomplete metadata element. The instructions may include directions for re-transmission of the subset of the plurality of metadata elements.

The email notification may be transmitted to an email distribution group. The email distribution group may be associated with a line of business. The line of business may be associated with the local repository from which the subset of metadata elements, including the incomplete metadata element, was received.

Because each plurality of metadata elements is inspected and checked prior to entry into the enterprise data registry, the enterprise data registry may include only normalized metadata elements. The normalized metadata elements may include only non-duplicate data elements. In some embodiments, duplicate data elements may be labeled as incomplete data elements.

During the process of halting the subset of metadata elements from being transmitted to the enterprise data registry, a duplicate copy of the halted transmission may be stored in a record registry. The record registry may also be configured to maintain records of each attempt to transmit the metadata elements to the enterprise data registry. The duplicate copy of the halted transmission may be a deep copy—i.e., a complete memory allocation and complete copy of the subset of metadata elements into the allocated portion of memory.

At times, a subset of the plurality of metadata elements is complete and is therefore entered into the enterprise data registry. When the subset of metadata elements is complete, the record registry may also maintain a reference to the transmission. The reference to the entered transmission may be a shallow copy of the subset of metadata elements that have been entered into the enterprise data registry. A reference or shallow copy may be reference information, or a pointer, stored in allocated memory. The reference, or pointer, may point to the data stored in the enterprise data registry. The record registry may also omit the step of maintaining a deep copy of the subset of metadata elements that have been entered into the enterprise data registry.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
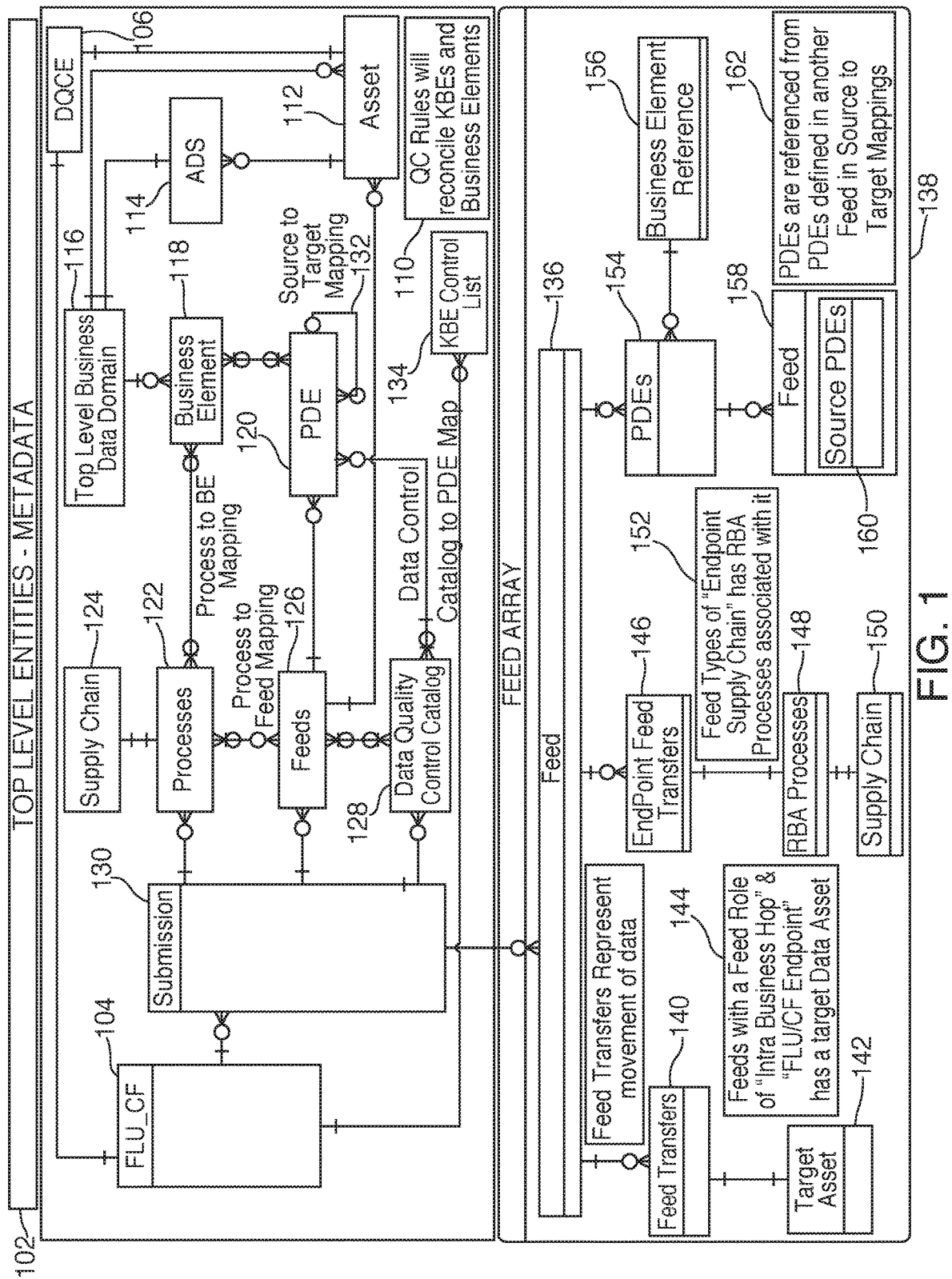
FIG. 1 shows an illustrative diagram in accordance with principles of the invention.

Apparatus and methods for a federated approach to collecting metadata is provided. Methods include collecting local metadata from local repositories into a central repository. The metadata collection may provide the means for stitching together data lineage of metadata elements. The federated approach may include a three-tiered collection approach. Metadata may be transmitted from a plurality of local systems to a plurality of local repositories. In some embodiments, the metadata may be continuously transmitted from the local systems to the local repositories. In other embodiments, the metadata may be transmitted in batches from the local system to the local repositories. A collection of metadata may be entered into a JSON API at the local system or at the local repository. The central repository, which may also be known for the purposes of this application as an enterprise data registry, may receive a plurality of JSON API files.

There are numerous benefits when transmitting metadata via a JSON API. The benefits may include ensuring the data integrity of the transmitted metadata. The JSON API requires identification from any key data supply chains. Therefore, this identification requirement includes contacting the local systems using the local repositories to ensure that the data transmitted includes all required information. For example, for metadata element X, the identification requirement includes identification of a system from which the element was transmitted, and identification of one or more secondary systems from which the metadata element was received. This identification process may continue until the system of origination is identified. This process may substantially guarantee receiving sufficient detail for each metadata element in order to stitch together the data lineage information. The data lineage information may be transmitted to the enterprise data registry with the metadata elements via the JSON API.

Another benefit of the JSON API is that the JSON API maintains relationship integrity. The JSON API maintains relationships between different functions, feeds and physical data elements ("PDE") within the metadata elements. A PDE may be a metadata element.

Another benefit of the JSON API is that the JSON API includes a front-line unit for business/control function ("FLU/CF"). The FLU/CF describes how the data is segmented. Segmentation of a metadata element is important because it enables the JSON API to identify data origination (within the metadata element), the particular type of data (within the metadata element) and a person responsible for the data (within the metadata element).

A variety of entities and attributes included in a JSON schema (The JSON schema being for the JSON API.) define different aspects of the data including structure of the JSON data, validation, documentation, hyperlink navigation and interaction control of the JSON API. Therefore, when the JSON API is received at the enterprise data registry, the enterprise data registry is able to predict the contents and define the components of each metadata element and their respective purposes. Table A includes a plurality of different entities and attributes that may be included in the JSON schema.

TABLE A

| Entities, Attributes and their respective Information | |
|---|---|
| Entity or Attribute | Information regarding entity or attribute: |
| Asset | An asset may include application identification information ("AIT"), governed models, critical use spreadsheets, top reports and other suitable assets. Attributes of an asset may include a unique identifier, attribute name, owning front-line unit ("FLU") and asset registration date. |
| Business Element ("BE") | A specific BE may be tagged. Each BE may be tied to a specific domain. Each BE may also include an information section classification code. |
| Feed | A feed may include a description of how the applications and/or data sources are sending the data from the source or target systems. An example of a feed may be - "I am a consumer and I am sending data across systems A, B and C." The feed may include a location path. The location path may be a physical location path, such as a host name, a file, a file path, or other |

TABLE A-continued

Entities, Attributes and their respective Information

| Entity or Attribute | Information regarding entity or attribute: |
|---|---|
| | information regarding where the physical data is located. The feed may also include feed asset identification information. The feed may include feed transfer information. The feed may also include endpoint transfer information. |
| Risk and Compliance ID | An identification number associated with an identification system and platform for ensuring that technology projects are in compliance with operational risk and compliance regulations. |
| BE process | Information regarding the BE. |
| Process | A process may include data quality information as well as control of data information. The process may include yes/no variables such as is funding identified, is the model a top model, is this a high-risk process and any other suitable yes/no variables. The process may also include risk identification and information. |
| BE to process mapping | A relationship between business elements and processes. |
| Process to feed mapping | A relationship between processes and feeds. |
| Feed transfer | A relationship that may be a description of the move of the data. This relationship may be defined within the API. The feed transfer relationship may define a location. The location may identify where the related feed is transferring. |
| Endpoint transfer | An origination of the data lineage for a metadata element. |
| Control Physical Data Element ("PDE") | The physical data element ("PDE") with which the control is associated. |
| Control | The quality check or movement check on a particular feed. The control includes how an entity is managing feeds and PDEs. Control includes information regarding feed asset identification, feed location path, feed name, requirement type, requirement front-line unit identification and any other suitable information. Control also includes yes/no queries such as - is blueprint for data accuracy available, is there a blueprint for data movement, is there a blueprint for reasonableness upon receipt and any other suitable yes/no queries. Control also includes timing information. |
| Physical Data Element ("PDE") | The lowest common denominator of how data elements are stored. The simplest data structure within the JSON API. |

An apparatus for collecting a plurality of data elements is provided. The apparatus may include a local system. The local system may include a transmitter. The apparatus may include a local repository. The transmitter may be configured to transmit the metadata elements to the local repository. The local repository may be configured to manipulate the data into a JSON API submission format for transmission to an enterprise data registry.

The JSON API submission format may include placeholders for identification of a plurality of entities and attributes. The entities and attributes may include a front-line unit for control function identification that identifies a metadata element. The front-line unit for control function identification may identify a metadata element. The front-line unit for control function identification may include a plurality of relationships.

The front-line unit for control function identification may include a relationship with one data quality control executive for managing the metadata element of the front-line unit for control function identification. The data quality control executive may include relationships with one asset.

The asset may include relationships with one top level business data domain. A top-level business data domain may be a logical grouping of data for a particular subject area. The asset may also include relationships with at least one feed. The at least one feed may be for determining a source system of the metadata element and a target system of the metadata element. The asset may also include relationships with a plurality of authorized data hubs. The authorized data hubs may be for storing, maintaining and distributing data and associated metadata. The plurality of authorized data hubs may include relationships with the top-level business data domain.

The front-line unit for control function identification may include relationships with a plurality of key business element control lists. The key business element control lists may identify controls of key business elements.

The front-line unit for control function identification may also include relationships with a plurality of submissions. The submission may include the metadata elements. The submissions may include relationships with a plurality of processes. The plurality of processes may include data quality of control information relating to the metadata. The processes may include a one to one relationship with a supply chain of data. The processes may also include a many to many relationship with the plurality of business elements.

The plurality of business elements may include a relationship with a plurality of feeds. The plurality of feeds may include a plurality of relationships with the asset and a plurality of data quality control catalogs. The data quality control catalogs may include relationships with physical data elements. The physical data elements may include self-referential relationships and relationships with the plurality of business elements and relationships with the plurality of feeds.

The many to many relationships may include, for example, the relationship between processes and the business elements may include a bridge table. The many to many relationships may also include a mapping of structured instructions included in the JSON API.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a conceptual data model according to certain embodiments. The conceptual data model may be a diagram that shows data relationships within the JSON API. The JSON API may include relationship constraints. The relationship constraints may structure entities and attributes of metadata elements that are being processed by the JSON API. Accordingly, entities and attributes of the metadata elements may be constrained by the relationships as defined by the exemplary characteristics of the JSON API, set forth in the conceptual data model.

The conceptual data model shows top-level entities. Top-level entities may be entities, included in a metadata element, which rank highest in importance. Top-level entities may be uniform across various lines of businesses ("LOBs") within an entity.

The conceptual model also shows data relationships between top-level entities and a feed array. The feed array may be a collection of feeds included in a metadata element. A feed may describe a method for metadata transmission. The method may be used by an application or data source included in the metadata element. The feed may also include source systems and/or target systems of an application or data source.

Additionally, internal and external reference data may be noted in the model. Internal reference data may include reference numbers specific to the enterprise data registry. External reference data may include reference numbers that are generic to the enterprise data registry. External reference data numbers may be used throughout different systems or LOBs included in an entity. A business data domain and a key business element ("KBE") control list may not be shown in the conceptual data model. The details of the conceptual data model may be set forth below.

Top-level entities—metadata is shown schematically at 102. FLU_CF entity 104 may be an entity. FLU_CF 104 may be an abbreviation for Front-line unit for business/control function. FLU_CF 104 may include an identification number. The identification number may reference a metadata element. FLU_CF 104 may include information that describes how data is segmented. FLU_CF 104 may be the highest-level entity within the conceptual model of the JSON API. Because FLU_CF 104 may be the highest-level entity within the conceptual model, the relationships in the conceptual model may begin with FLU_CF 104, and FLU_CF 104 may lead the structure of the relationships within the JSON API.

FLU_CF 104 may maintain a one to zero, one to one or one to many relationship with KBE (Key Business Element) Control List 108. A front-line unit for control function identification may include many key business element control lists. QC (Quality control) rules may reconcile KBEs and business elements to ensure correctness and completeness, as shown at 110.

FLU_CF 104 may maintain a one to one relationship DQCE 106. DQCE 106 may be an acronym for data quality control executive. A DQCE may be a person or position that manages assets.

DQCE 106 may have a one to one relationship with assets 112. The one to one relationship may indicate that a DQCE may maintain one asset. It should be appreciated that one person may take on numerous roles, and, thereby, maintain more than one asset.

Asset 112 may have a one to zero or many relationship with ADS 114. ADS 114 may be an acronym for authorized data source. An authorized data source may be a label for a particular type of system or hub. Functions of a hub or system may include storing its data, managing its data and distributing its data. The ADS may describe how to distribute data and how the data is segmented into different types. As an example, a mortgage hub or finance hub or other authorized data source may store, manage and, when necessary, distribute its own data. The hub or system may also track the data assets. The tracking may provide insight into data movement. Standard, or typical data movement may include data that originates from, or relates to, an ADS. Data that does not originate from, or is not related to, an ADS, may require further inspection. Data that is not related to an ADS may present a warning that the data is not being pulled from the correct location. Therefore, the registry may be required to check that the data is being pulled in the correct fashion from the correct location.

ADS 114 may have a one to one relationship with top-level business data domain 116. A top-level business data domain may be a logical grouping of data based on a particular subject area. The subject area may be product-based. For example, the subject matter may be defined as deposits, credit cards, mortgages, etc. The subject area may be reference-data-based. For example, the subject matter may be defined as customer information, client information, traded products agreement information, etc. The subject area may be derived data. For example, the subject matter may be defined as liquidity data or capital data. Each authorized data source may be related to one top-level business data domain. Top-level business data domain 116 may have a one to zero or one to many relationship with asset 112. Each top-level business data domain may include zero, one or many assets.

Top-level business domain 116 may have a one to zero, or one to many relationship with business element 118. Each top-level business domain may have zero business elements or many business elements. Business element 118 may have a zero to zero, zero to one, zero to many, one to zero, one to one, one to many, many to zero, many to one or many to many relationship with processes 122. A many to many relationship may require a bridge table. The bridge table may be a map that shows relationships between business element 118 and processes 122. Table B shows an exemplary bridge table between Business element 118 and processes 122.

TABLE B

Bridge table showing relationships between business elements and processes

| | | |
|---|---|---|
| Relationship 001 | Business Element A | Process X |
| Relationship 002 | Business Element B | Process X |
| Relationship 003 | Business Element C | Process X |
| Relationship 004 | Business Element A | Process Y |
| Relationship 005 | Business Element A | Process Z |
| Relationship 006 | Business Element B | Process Z |
| Relationship 006 | Business Element C | Process Y |

Processes 122 may have a one to one relationship with supply chain 124. Each process may relate to one supply chain as it relates to one process. Processes 122 may have zero to zero, zero to many, one to zero, one to many, many to zero or many to many relationship with feeds 126. A feed, which describes how the applications or data sources are sending the data from the source or target systems, may relate to numerous processes. A process, which includes data quality and data control information, may relate to numerous feeds. As described above, a relationship that has the capability to be a many to many relationship may require a bridge table. Therefore, a bridge table may be required for processes 122 to communicate with feeds 126.

Feeds 126 may have a zero to zero, zero to one, zero to many, one to zero, one to one, one to many, many to zero, many to one or many to many relationship with Data quality control catalog 128. Each feed may be included in a plurality of data quality control catalogs. Each data quality control catalog may include a plurality of feeds. As described above, a bridge table may be required for this relationship.

Submission 130 may have a one to zero or one to many relationship with processes 122, feeds 126 (the feed array with which submission 130 also has a one to zero or one to many relationship, is separated below at feed 136) and data quality control catalog 128. Each submission, which may be a subset of metadata elements in JSON format submitted to the enterprise data registry, may include numerous processes, feeds and data quality control catalogs. It should be appreciated that, in some embodiments, because each submission may have a one to zero or one to many relationship with processes 122, feeds 126 and data quality control catalog 128, each process, feed and catalog can only be submitted once to the enterprise data registry. This limitation may enable the registry to prevent duplicate data from being entered into the registry.

FLU_CF 104 may have a one to zero, one to one or one to many relationship with submission 130. A front-line unit control function may relate to numerous submissions.

The lowest common denominator in which data elements are stored is called a PDE. PDE may be an acronym for physical data element. Each physical data element may be a relatively small segment of data. A PDE may include a one to zero or one to many relationship with itself. A relationship to self may be when a PDE references one or more other PDEs. This may be shown at 132 which includes source to target mapping.

Business element 118 may include a zero to zero, zero to one, zero to many, one to zero, one to one, one to many, many to one, many to zero or many to many relationship with PDE 120. Each business data element may relate to numerous PDEs and each PDE may relate to numerous business elements. It should be appreciated that, as described above, a bridge table may be required.

PDE 120 may have a zero to one, zero to zero, zero to many, zero to one, many to one, many to zero or many to many relationship with data quality control catalog 128. Each PDE may be included in numerous catalogs and each catalog may include a plurality of PDEs. As described above, a bridge table may be required. The bridge table may be named data control catalog to PDE Map, as shown at 134.

Feeds 126 may have a one to zero or one to many relationship with PDE 120. Each feed may include numerous PDEs. Feeds 126 may also include a one to zero or many relationship with asset 112. Each feeds may include a plurality of assets.

Submission 130 may have a one to zero or one to many relationship with feed 136, included in feed array 138. Feed 136 may have a one to zero or one to many relationship with feed transfers 140. Feed transfers may represent the movement of data. Each feed may include a plurality of data movements. Feed transfers 140 may have a one to one relationship with target asset 142. Each feed transfer may have one target asset. Each feed transfer may have at least one characteristic that defines the role of the feed. The name of the characteristic may be feed role. Feeds with a feed role of "intra business hop" and "FLU_CF endpoint" may have a target data asset, as shown at 144.

Feed 136 may have a one to zero or one to many relationship with endpoint feed transfers 146. Each feed may have multiple endpoint feed transfers. Endpoint feed transfers 146 may have a one to one relationship with RBA ("Risk based approach") processes 148. RBA processes may be processes for risk report generation e.g., is this process high risk, medium risk or low risk. Each feed transfer may be high-risk, medium-risk or low risk. Feed types of "endpoint supply chain" may be associated with RBA processes. RBA processes may have a one to one relationship with supply chain 150. Each RBA process may be associated with one supply chain of data. Supply chain 150 may be a chain of entities from where a data element was pulled.

Feed 136 may have a one to zero or one to many relationship with PDEs 154. One feed may have multiple PDEs. Business Element reference 156 may have a one to zero or one to many relationship with PDEs 154. Each business element reference may include multiple physical data elements.

PDEs 154 may have a one to zero or one to many relationship with feed 158. It should be appreciated that feed 158 may be a different table than feed 136, even though the two tables share a name. Feed 158 may include a sub table—source PDEs 160. PDEs may reference other PDEs defined in other feeds in source to target mappings, as shown at 162.

Figure 2:
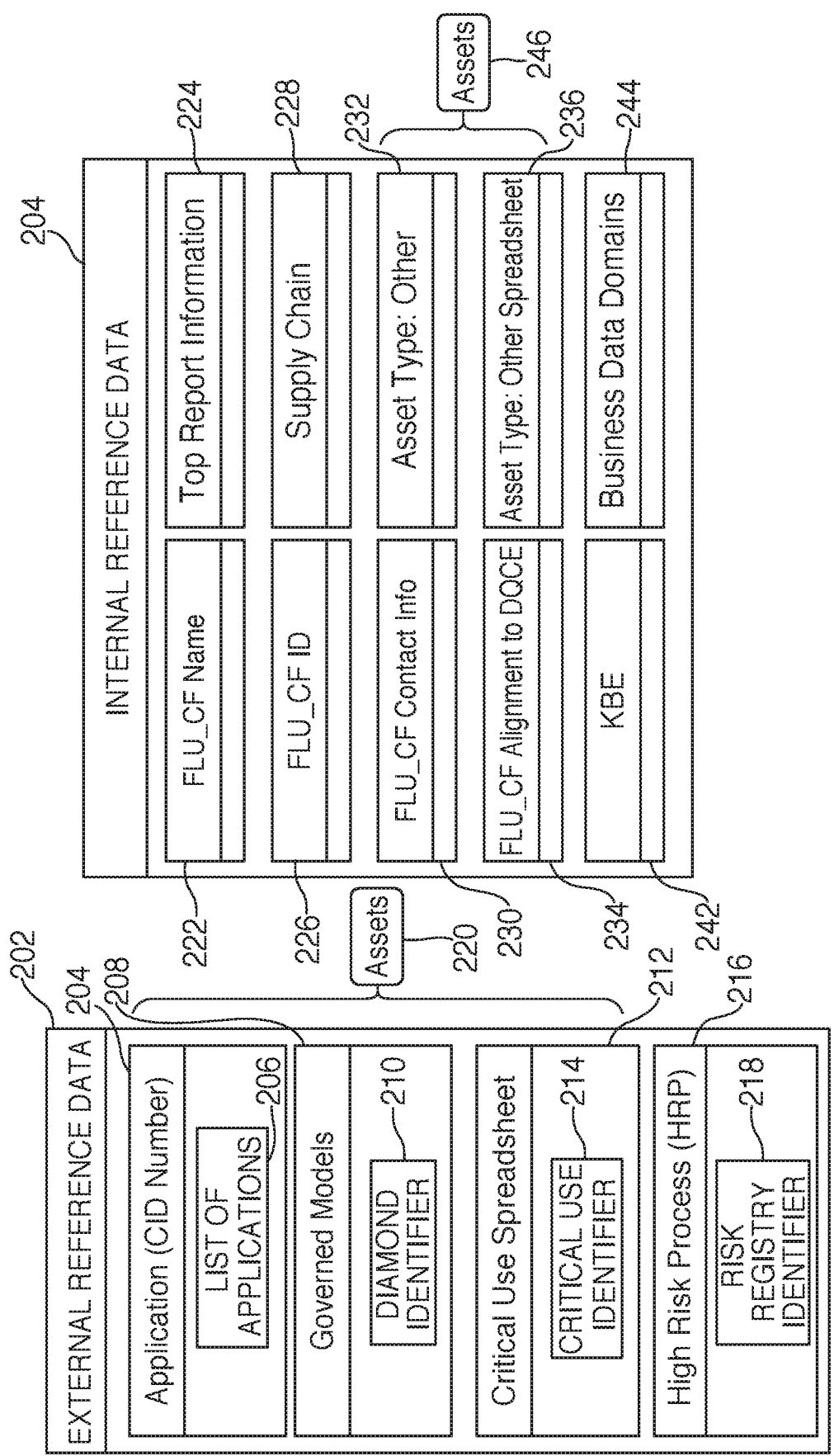
FIG. 2 shows another illustrative diagram in accordance with principles of the invention.

FIG. 2 shows two reference data charts 202 and 204. Requiring the inclusion of reference data with each submission is critical to enforcing data completeness and validity. The registry can correctly identify the data lineage of the metadata element when a metadata element is submitted with its proper reference data.

External reference data chart 202 includes external reference data collections. Each external reference data collection may include identification information. The identification information may enable tracking of a metadata element using an identification system specific to the reference data collection.

External reference data collection may include: Application (ID Number) 204, Governed models 208, critical use spreadsheet 212 and high risk process 216. Application (ID Number) 204 may include list of applications 206. List of applications 206 may provide application identification. Information, such as line of business and associated personnel, can be determined when a metadata element can relate to list of applications 206. Each submitted metadata element may be required to include an application identification. Governed models 208 may include diamond identifier 210. Diamond identifier 210 may identify a metadata element based on its location within the governed models. Critical use spreadsheet 212 may include critical use identifier 214. Critical use identifier 214 may identify a metadata element based on its location within a critical use spreadsheet. High risk process 216 may include risk registry identifier 218. Risk registry identifier 218 may identify the metadata element within a risk reporting database. It should be appreciated that application (ID number) 204, governed models 208 and critical use spreadsheet 212 may be assets, as shown at 220.

Internal reference data collection 204 may include a plurality of internal reference data collections. Each internal reference data collection may provide an identification system. The identification system may be used to identify metadata elements and data lineage information associated with the metadata elements. Internal reference data collection 204 includes FLU_CF name 222, top report information 224, FLU_CF ID 226, supply chain 228, FLU_CF contact info 230, Asset type: other 232, FLU_CF alignment to DQCE 234, Asset type: other spreadsheet 236, KBE ("key business element") 242 and business data domains 244. It should be appreciated that asset type: other and asset type: other spreadsheets may be asset information, as shown at 246.

Figure 3A:
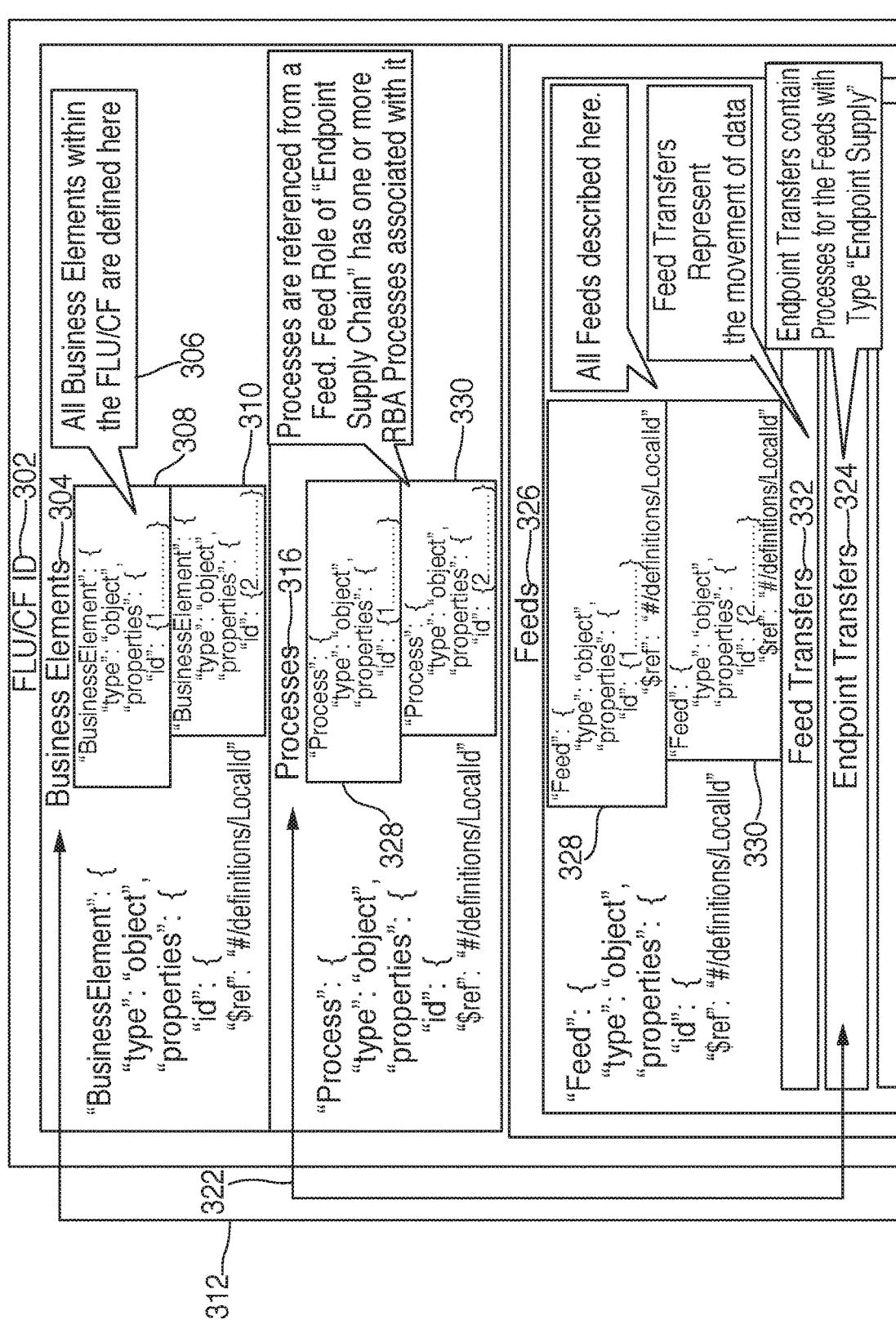
FIGS. 3A and 3B show yet another illustrative diagram in accordance with principles of the invention.
Figure 3B:
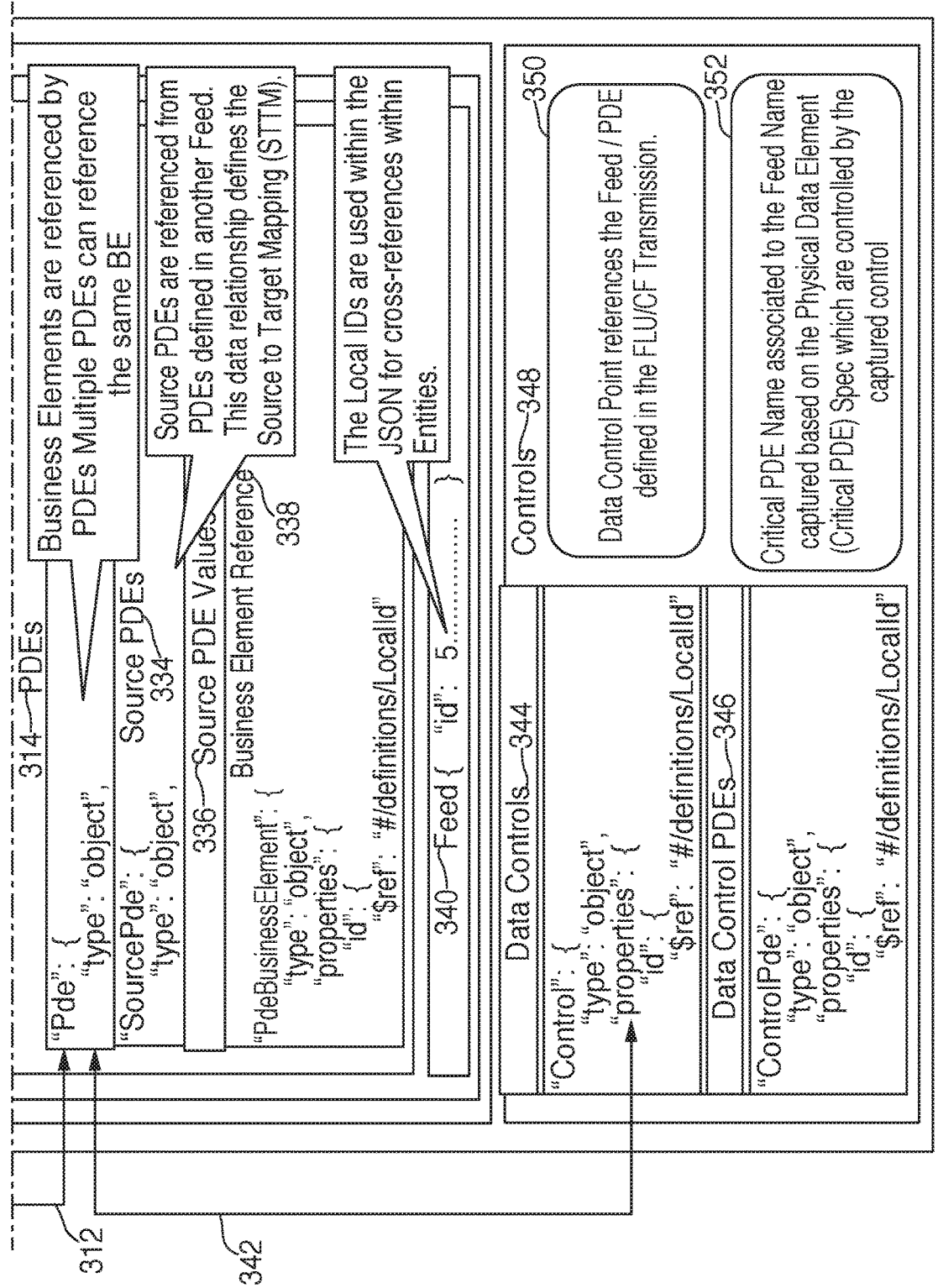

FIGS. 3A and 3B show a JSON hierarchal model. FLU/CF ID shown at 302 provides a front-line unit identification for the business/control function that is submitting the metadata elements. FLU/CF ID may be a required field for the JSON API.

Business elements, shown at 304, show a list of business elements that may be referred to by PDEs. An introduction to an exemplary syntax of a business element included in the JSON may be:

```
"BusinessElement":{
    "type": "object",
    "properties": {
        "id": {
            "$ref: "#/definitions/LocalId"
```

Business elements within the FLU/CF may be defined within business elements 304, as shown at 306. Each business element may include an identification number. Multiple business elements may be included in one FLU/CF ID, as shown at 308 (id=1) and 310 (id=2).

Join 312 may show that business element 304 is connected to PDEs 314. An introduction to an exemplary syntax for a PDE within a JSON API is:

```
"Pde": {
    "type": "object",
```

Join 312 may indicate a possibility of a many to many relationship between business element 304 and PDEs 314. Join 312 may indicate that multiple business element may be referenced by PDEs and multiple PDEs can reference the same business element. Join 312 may utilize a bridge table (not shown). The JSON API may include JSON code in the JSON schema. The JSON code may be similar to a bridge table and may work in place of a bridge table. The bridge table may be included in the structure of the JSON code by using a table structure within the JSON API submission. The code structured to act as a table may include: a plurality of business elements and the PDEs the business elements reference; and a plurality of PDEs and the business elements the PDEs reference. In some embodiments, the structure of the bridge table may be included in either the structure of the business element or the structure of the PDE. In these embodiments, the business element of PDE may include an array of identification numbers that include the referenced business elements or PDEs. An introduction to an exemplary syntax for referencing business elements (shown at business element reference 338) within a PDE is shown below.

```
"PdeBusinessElement":{
    "type": "object",
    "properties": {
        "id": {
            "$ref: "#/definitions/LocalId"
```

PDEs 314 may join with data controls 344 using join 342. Join 342 may include the data control catalog to PDE map, as shown in FIG. 1.

Source PDEs 334 may be referenced from PDEs defined in another feed. This data relationship may define the source to target mapping, shown in FIG. 1.

Source PDE values 336 may be values of the source PDEs.

Processes 316 may include risk identification information as described above. An introduction to an exemplary syntax of a process included in the JSON API may be:

```
"Process":{
    "type": "object",
    "properties": {
        "id": {
            "$ref: "#/definitions/LocalId"
```

Process information and process to feeds information may only be required when the associated feed is an endpoint of a data supply chain. Join 322 may relate processes 316 to endpoint transfers 324. Endpoint transfers 324 may include processes for the feeds with type "endpoint supply chain." Endpoint transfers may be recognizable by a variable named "feed role". The feed role variable may be included in a feed. The feed role variable may include the term "endpoint supply chain."

There may be multiple processes included in a JSON API as shown at 318 (id=1) and 320 (id=2).

Feed 326 may include information relating to a feed. An introduction to an exemplary syntax of a feed included in the JSON API may be:

```
"Feed":{
    "type": "object",
    "properties": {
        "id": {
            "$ref: "#/definitions/LocalId"
```

There may be multiple feeds included in a JSON API submission, as shown at 328 (id=1) and 330 (id=2).

Feed transfers 332 may represent the movement of data or metadata elements.

Feed 340 may include an id number. It should be appreciated that local ids are used within the JSON API for cross-reference within entities.

Controls 348 may include data controls 344 and data control PDEs 346. Data control point references the feed or PDE defined in the FLU/CF submission, as shown at 350. Data control point may include references to asset, feed and PDE to which the control is related.

Critical PDE Name associated with the feed names may be captured based on the PDE, or critical PDE specifications, as shown at 352. The PDE or critical PDE specifications may be controlled by the captured control.

Figure 4:
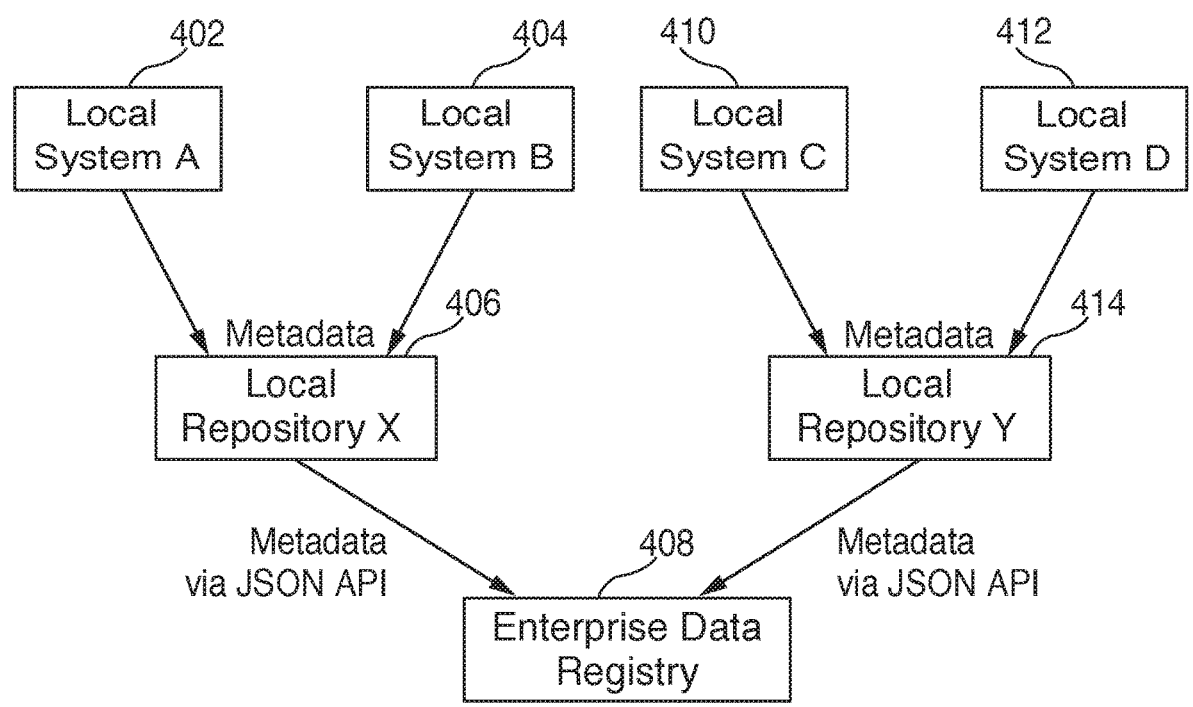
FIG. 4 shows an illustrative JSON API map in accordance with principles of the invention.

FIG. 4 shows an architecture diagram of metadata submissions to an enterprise data registry. Metadata from local system A, shown at 402, and local system B, shown at 404, may be submitted to local repository X, shown at 406.

Metadata from local system C, shown at 410, and local system D shown at 412, may be submitted to local repository Y, shown at 414. The collected metadata at local repository X and local repository Y may be submitted to enterprise data registry, as shown at 408.

Appendix A shows an exemplary JSON API.

Thus, methods and apparatus for maintaining data integrity and referential data integrity within an enterprise data registry have been provided. Persons skilled in the art will appreciate that the present invention can be practiced by other than the described embodiments, which are presented for purposes of illustration rather than of limitation.

What is claimed is:

1. A system for maintaining an enterprise data registry, the system comprising:
    a processor;
    a plurality of local systems, each of the local systems comprises one or more metadata elements, each of the local systems is configured to transmit the one or more metadata elements to a plurality of local repositories;
    the plurality of local repositories, each of the plurality of local repositories is configured to:
        receive the one or more metadata elements from one or more local systems included in the plurality of local systems; and
        transmit the one or more metadata elements to an updatable JavaScript Object Notation ("JSON") Application Programming Interface ("API");
    the updatable JSON API being executed by the processor, the updatable JSON API being configured to:
        receive the one or more metadata elements from the plurality of local repositories, the one or more metadata elements being a plurality of metadata elements;
        transmit the received plurality of metadata elements to the enterprise data registry:
    the enterprise data registry is configured to receive the plurality of metadata elements from the updatable JSON API;
wherein the updatable JSON API is operable to:
    maintain the relationships between metadata elements included in the plurality of metadata elements; and
    maintain data integrity of the plurality of metadata elements;
    when at least one metadata element, included in the plurality of metadata elements, is determined by the updatable JSON API to be incomplete and the incompleteness of at least one metadata element is fatal to the metadata element viability within the enterprise registry, the updatable JSON API is configured to:
    halt the transmission of a subset of the plurality of metadata elements, the subset that includes the incomplete metadata element, to the enterprise data registry; and
    transmit an alert, regarding the subset of metadata elements and the incomplete metadata element, to the local repository from which the incomplete metadata element was received, the alert comprises an email notification, said email notification comprising:
        a description of the incompleteness;
        a uniform resource locator ("URL"), said URL, when selected, directs the selector to a webpage that displays a copy of the transmitted metadata elements formatted to the updatable JSON API, said copy highlighting specific values and specific rows that require correction; and
        instructions for correction of the incomplete metadata elements.

2. The system of claim 1, further comprising a quality check center, said quality check center configured to check the quality of the plurality of metadata elements, the quality check center comprising a plurality of quality checks, wherein each quality check, included in the plurality of quality checks, includes a switch capability, said switch capability enabling each quality check to be turned on or off depending on a number of attributes included in a transmission of a subset of metadata elements to the enterprise data registry.

3. The system of claim 1, wherein the email notification is transmitted to an email notification group associated with a line of business associated with the local repository from which the subset of metadata elements including the incomplete metadata element was received.

4. The system of claim 1, wherein the enterprise data registry includes only normalized metadata elements, said normalized data including only non-duplicate data elements.

5. The system of claim 1, wherein, while the subset of metadata elements comprising an incomplete metadata element is halted from being transmitted to the enterprise data registry, a deep copy of the transmission is stored in a record registry, said record registry configured to maintain records of each transmission attempt to the enterprise data registry.

6. The system of claim 5, wherein when a second subset of complete metadata elements are transmitted to the enterprise data registry, the record registry maintains a reference to the second subset of complete metadata elements that have been transmitted to the enterprise data registry and omits maintaining a deep copy of the second subset of complete metadata elements that have been transmitted to the enterprise data registry.

7. A method for maintaining an enterprise data registry, the method comprising:
    transmitting a plurality of metadata elements from a plurality of local systems to a plurality of local repositories;
    receiving the plurality of metadata elements, at the plurality of local repositories;
    transmitting the plurality of metadata elements from the plurality of local repositories to the enterprise data registry;
    intercepting the plurality of metadata elements at an updatable JavaScript Object Notation ("JSON") Application Programming Interface ("API"), the updatable JSON API being configured to:
        maintain the relationships between metadata elements included in the plurality of metadata elements; and
        maintain data integrity of the plurality of metadata elements;
wherein, when at least one metadata element, included in the plurality of metadata elements, is determined by the updatable JSON API to be incomplete and the incompleteness of at least one metadata element is fatal to the metadata element viability within the enterprise data registry, the updatable JSON API is configured to:
    halt the transmission of a subset of the plurality of metadata elements, the subset that includes the incomplete metadata element, to the enterprise data registry; and
    transmit an alert, regarding the subset of metadata elements and incomplete metadata element, to the local repository from which the incomplete metadata element was received, the alert comprises an email notification, the email notification comprising:
        a description of the incompleteness;

a uniform resource locator ("URL"), said URL, when selected, directs the selector to a webpage that displays a copy of the transmitted metadata elements formatted to the updatable JSON API, said copy highlighting specific values and specific rows that require correction; and instructions for correction of the incomplete metadata elements;

transmitting the plurality of metadata elements from the JSON API to the enterprise data registry.

8. The method of claim 7, wherein the metadata elements are transmitted through a quality check center prior to entry into the enterprise data registry, said quality check center configured to check the quality of each subset of metadata elements transmitted to the enterprise data registry, said quality check center comprising a plurality of quality checks, wherein each quality check included in the plurality of quality checks, includes a switch capability, said switch capability enabling each quality check to be turned on or off depending on a number of attributes included in each transmission of a subset of metadata elements to the enterprise data registry.

9. The method of claim 8, wherein the email notification is transmitted to an email notification group associated with a line of business, said line of business associated with the local repository from which the subset of metadata elements including the incomplete metadata element was received.

10. The method of claim 7, wherein the enterprise data registry includes only normalized metadata elements, said normalized data including only non-duplicate data elements.

11. The method of claim 7, wherein, while the subset of metadata elements comprising an incomplete metadata elements is halted from being transmitted to the enterprise data registry, a deep copy of the transmission is stored in a record registry, said record registry configured to maintain records of each transmission attempt to the enterprise data registry.

12. The method of claim 11, wherein when a second subset of complete metadata elements are transmitted to the enterprise data registry, the record registry maintains a reference to the second subset of complete metadata elements that have been transmitted to the enterprise data registry and omits maintaining a deep copy of the second subset of complete metadata elements that have been transmitted to the enterprise data registry.

* * * * *